US009588666B2

(12) United States Patent
Otomaru et al.

(10) Patent No.: US 9,588,666 B2
(45) Date of Patent: Mar. 7, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Itaru Otomaru, Tokyo (JP); Takuya Ishida, Tokyo (JP); Kazuhiro Miyasa, Yokohama (JP); Kiyohide Satoh, Kawasaki (JP)

(73) Assignee: Canon Kabushiki Kiasha, Tokyo (JP)

( * ) Notice: Subject to any disclaimer, the term of this patent is extended or adjusted under 35 U.S.C. 154(b) by 0 days.

(21) Appl. No.: 14/799,271

(22) Filed: Jul. 14, 2015

(65) Prior Publication Data

US 2016/0019706 A1 Jan. 21, 2016

(30) Foreign Application Priority Data

Jul. 16, 2014 (JP) .................................. 2014-146076

(51) Int. Cl.
*G06F 3/0484* (2013.01)
*G06T 7/00* (2006.01)

(52) U.S. Cl.
CPC ........ *G06F 3/04845* (2013.01); *G06T 7/0028* (2013.01); *G06T 2207/20101* (2013.01); *G06T 2207/30004* (2013.01)

(58) Field of Classification Search
CPC . G06F 21/32; G06F 3/04845; G06K 9/00087; G06K 9/00483; G06K 9/00006;
(Continued)

(56) References Cited

U.S. PATENT DOCUMENTS

| 7,349,560 B2* | 3/2008 | Miyazaki | ............ G06K 9/00087 382/124 |
| 2003/0164886 A1* | 9/2003 | Chen | ...................... H04N 9/045 348/272 |

(Continued)

FOREIGN PATENT DOCUMENTS

| JP | 2008-212680 A | 9/2008 |
| JP | 2013-198722 A | 10/2013 |

OTHER PUBLICATIONS

D.Rueckert et al.,"Nonrigid Registration Using Free-Form Deformations: Application to Breast MR images", IEEE Transactions on Medical Imagin., Aug. 8, 1999, vol. 18, No. 8, pp. 712-721.

*Primary Examiner* — Jingge Wu
(74) *Attorney, Agent, or Firm* — Canon U.S.A., Inc. IP Division

(57) ABSTRACT

First, a displacement field (first displacement field) for deforming a first image so as to associate the first image with a second image is calculated based on information on an input corresponding point group. Then, upon a corresponding point candidate pair being input, a displacement field (second displacement field) for deforming the first image so as to associate the first image with the second image is calculated with the corresponding point candidate pair taken into consideration as well. Thereafter, a matching degree is calculated based on a difference between the two displacement fields, and a determination result indicating a match or a mismatch is displayed on a display unit.

8 Claims, 9 Drawing Sheets

(58) Field of Classification Search
CPC .............. G06K 9/00885; G06K 9/4609; G06T 2207/10072; G06T 2207/30004; G06T 11/60; G06T 7/0042
See application file for complete search history.

(56) References Cited

U.S. PATENT DOCUMENTS

| | | | | |
|---|---|---|---|---|
| 2005/0185844 | A1* | 8/2005 | Ono | G06K 9/00201 382/190 |
| 2007/0065045 | A1* | 3/2007 | Iwasaki | G06K 9/6203 382/305 |
| 2009/0028389 | A1* | 1/2009 | Edanami | G06K 9/468 382/104 |
| 2010/0158471 | A1* | 6/2010 | Ogikubo | G06F 3/04845 386/278 |
| 2011/0254942 | A1* | 10/2011 | Suzuki | G06K 9/00221 348/77 |
| 2013/0016889 | A1* | 1/2013 | Myronenko | G06T 7/003 382/131 |
| 2014/0193099 | A1* | 7/2014 | Yoshikawa | A61B 8/5246 382/295 |
| 2015/0234861 | A1* | 8/2015 | Kojima | G06F 17/30247 382/190 |

* cited by examiner

FIRST CROSS-SECTIONAL IMAGE 201    SECOND CROSS-SECTIONAL IMAGE 202

FIRST DISPLACEMENT FIELD 204    SECOND DISPLACEMENT FIELD 205

DISPLACEMENT VECTORS OF FIRST DISPLACEMENT FIELD AND SECOND DISPLACEMENT FIELD AT POSITION OF SECOND POINT 206

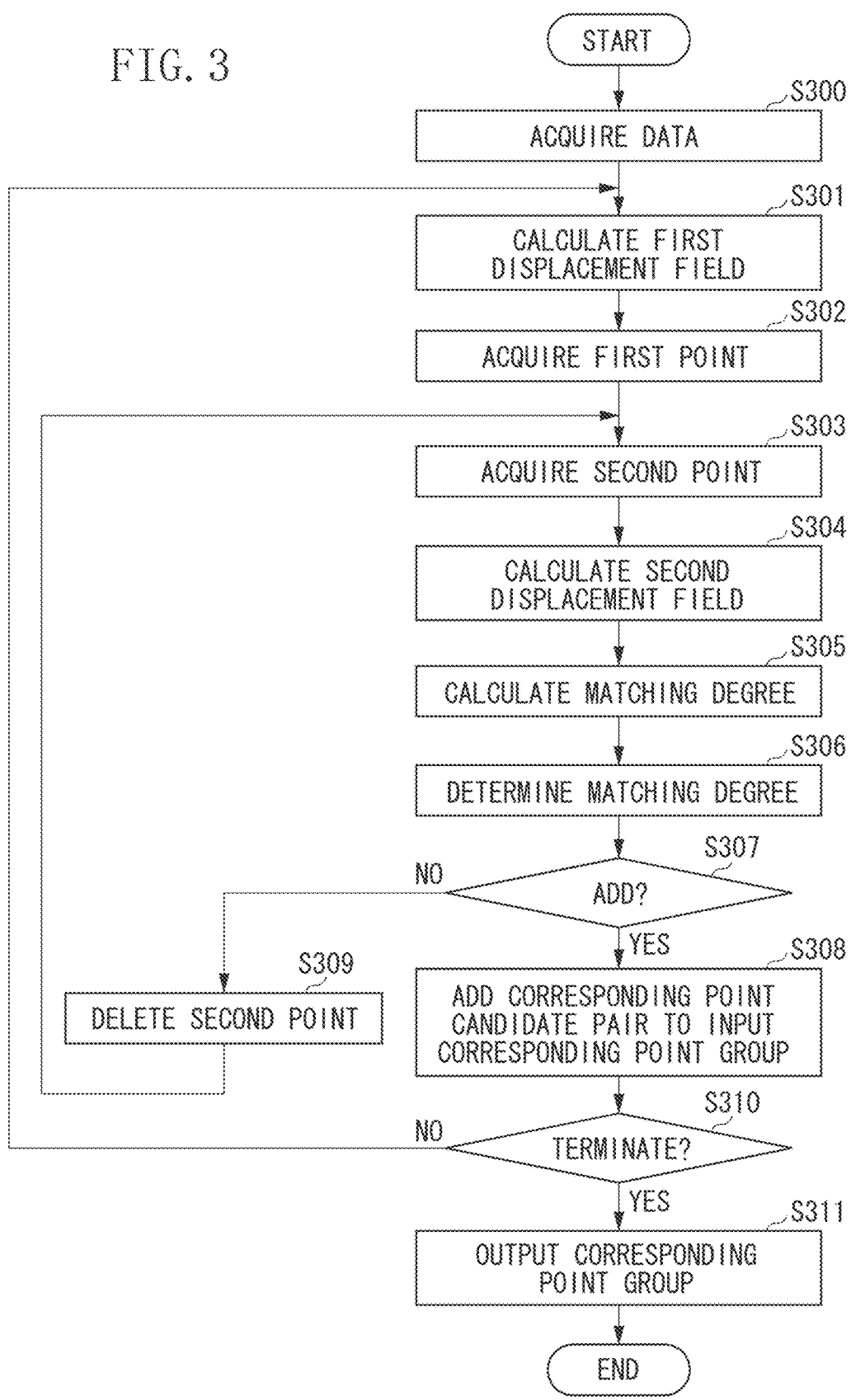

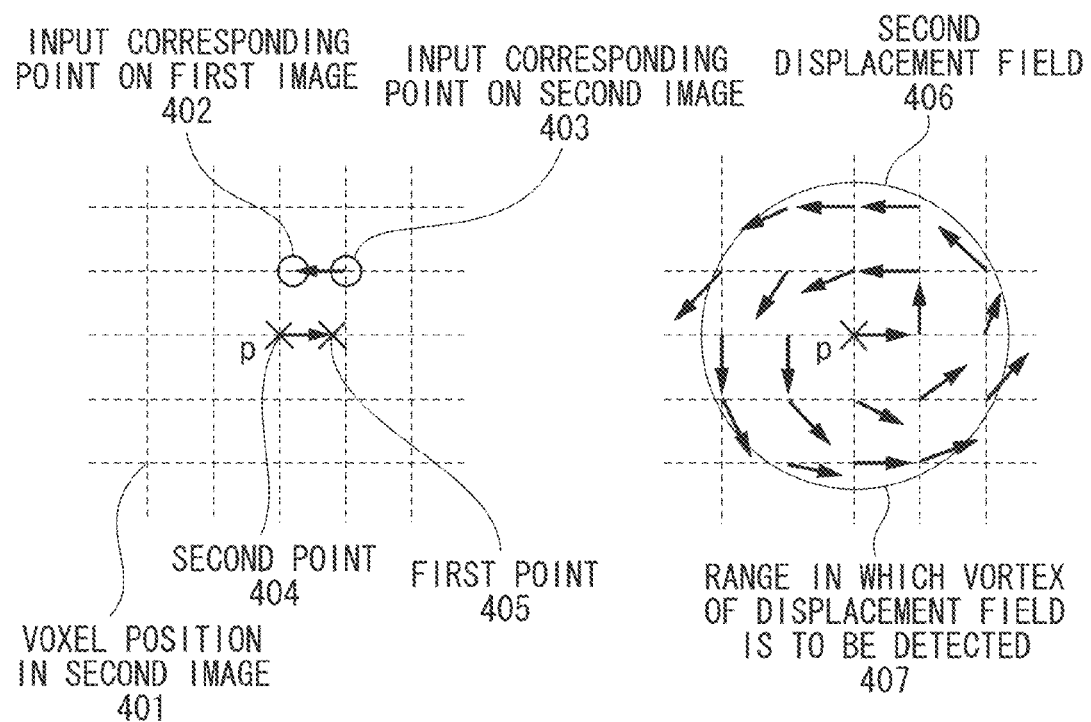

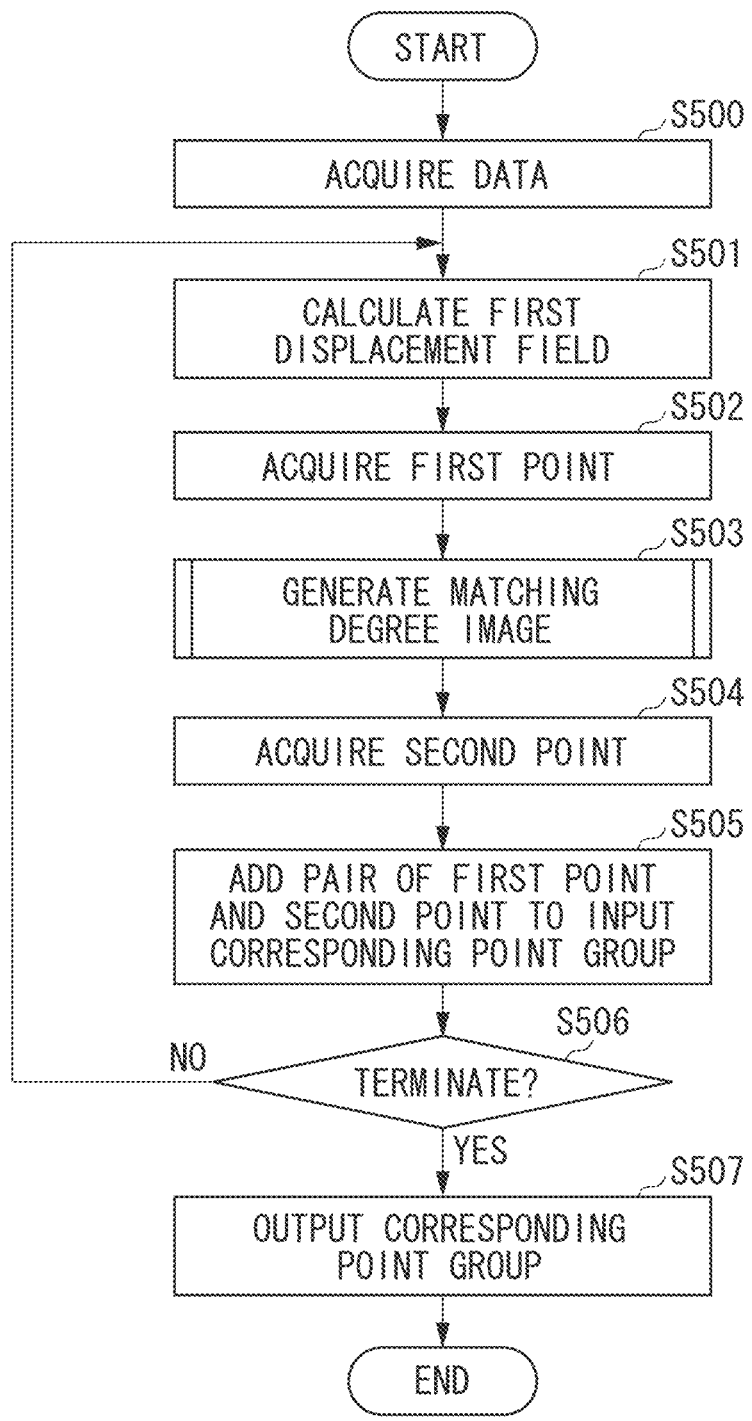

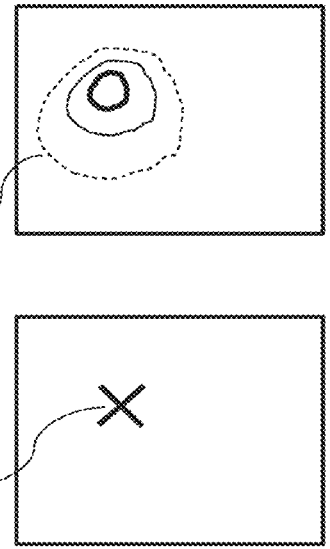
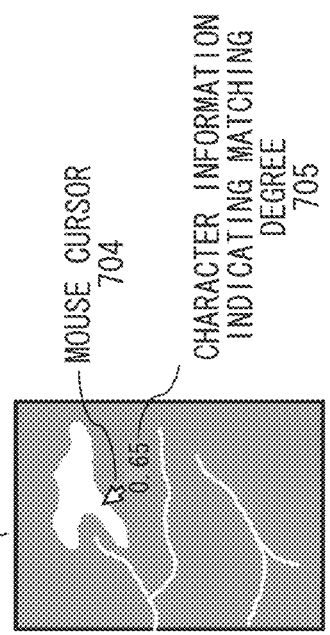
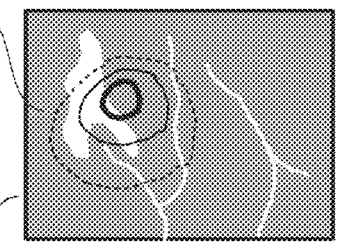

IMAGE PROCESSING APPARATUS, IMAGE PROCESSING METHOD, AND STORAGE MEDIUM

BACKGROUND OF THE INVENTION

Field of the Invention

The present disclosure generally relates to image processing and, in particular, to an image processing apparatus, an image processing method, and a storage medium that are suitably used to associate positions between images.

Description of the Related Art

In the medical field, in order to use medical images captured in a plurality of modalities or medical images captured at different times and dates, in different body orientation, or in different imaging modes, for making a diagnosis, it is important to associate target points within a subject between the medical images. Some target points can be associated automatically through image processing while the others cannot be easily associated automatically due to a difference in the modality or deformation of the subject. Therefore, doctors typically carry out an association operation while visually checking the images.

To achieve a similar purpose, there has been proposed a technique for displaying a plurality of images with their positions being adjusted. Here, to realize position adjustment with higher accuracy, there has been often employed a method of acquiring corresponding points which a user has visually associated with each other, and using the corresponding points in the position adjustment process. Thus, the accuracy of position adjustment varies depending on the accuracy of association.

Therefore, a technique for supporting an association operation is discussed. According to the technique, a target point is pointed out on one image (hereinafter, a reference image), and another image (hereinafter, a target image) is searched for the target point. For example, Japanese Patent Application Laid-Open No. 2008-212680 discusses a technique of displaying an estimated position of a target point with being superimposed on a target image. In addition, Japanese Patent Application Laid-Open No. 2013-198722 discusses a technique of displaying the existence probability distribution of a target point with being superimposed on a target image. However, these techniques respectively discussed in Japanese Patent Application Laid-Open No. 2008-212680 and Japanese Patent Application Laid-Open No. 2013-198722 have shortcomings in that the appropriateness of the corresponding points input by the user cannot be evaluated.

SUMMARY OF THE INVENTION

The present disclosure is directed to a technique for presenting evaluation of a corresponding point input by a user.

According to an aspect of the present disclosure, an image processing apparatus includes a correspondence information acquisition unit configured to acquire correspondence information between a first image and a second image, a corresponding point candidate acquisition unit configured to acquire a corresponding point candidate pair including a coordinate of a first point on the first image and a coordinate of a second point on the second image, a matching degree calculation unit configured to calculate a matching degree of the corresponding point candidate pair acquired by the corresponding point candidate acquisition unit, with respect to the correspondence information acquired by the correspondence information acquisition unit, and a display control unit configured to display a calculation result of the matching degree calculation unit on a display unit.

Further features of the present disclosure will become apparent from the following description of exemplary embodiments with reference to the attached drawings.

BRIEF DESCRIPTION OF THE DRAWINGS

FIG. 3 is a flowchart illustrating an example of overall processing procedures carried out by the image processing apparatus according to the first exemplary embodiment.

FIGS. 4A and 4B illustrate an example of a vortical displacement field.

FIG. 5 is a flowchart illustrating an example of overall processing procedures carried out by the image processing apparatus according to the second exemplary embodiment.

FIGS. 7A, 7B, and 7C illustrate an example of a display screen in which a matching degree map is superimpose-displayed.

DESCRIPTION OF THE EMBODIMENTS

Hereinafter, an image processing apparatus according to an exemplary embodiment of the present disclosure will be described with reference to the accompanying drawings. The present disclosure is not limited to the examples illustrated in the accompanying drawings.

An image processing apparatus according to a first exemplary embodiment obtains a matching degree indicating that, with respect to a corresponding point candidate pair on images specified by a user, the two points form a corresponding point pair, and displays the obtained matching degree. The corresponding point pair as used herein refers to two points including a target point on a first image and a point on a second image that corresponds to the target point. In addition, the corresponding point candidate pair refers to two points specified by the user as candidates for forming a corresponding point pair.

In this manner, since the matching degree of a corresponding point candidate pair is obtained and the obtained matching degree is displayed, each time the user specifies a corresponding point candidate pair, the user can check the matching degree of the specified corresponding point candidate pair. Through this configuration, when it is determined that a corresponding point candidate pair specified by the user is a mismatch, the user can specify another corresponding point candidate and input a corresponding point candidate pair at more appropriate positions. In the present exemplary embodiment, the matching degree of a corresponding point candidate pair is calculated as a matching degree with respect to known correspondence information between the first image and the second image. In addition, the known correspondence information in the present exemplary embodiment is information on a plurality of pairs of corresponding points which have already been associated with each other (hereinafter, referred to as input corresponding point group). Hereinafter, the configuration and the processes according to the present exemplary embodiment will be described with reference to FIGS. 1 through 3.

Figure 1:
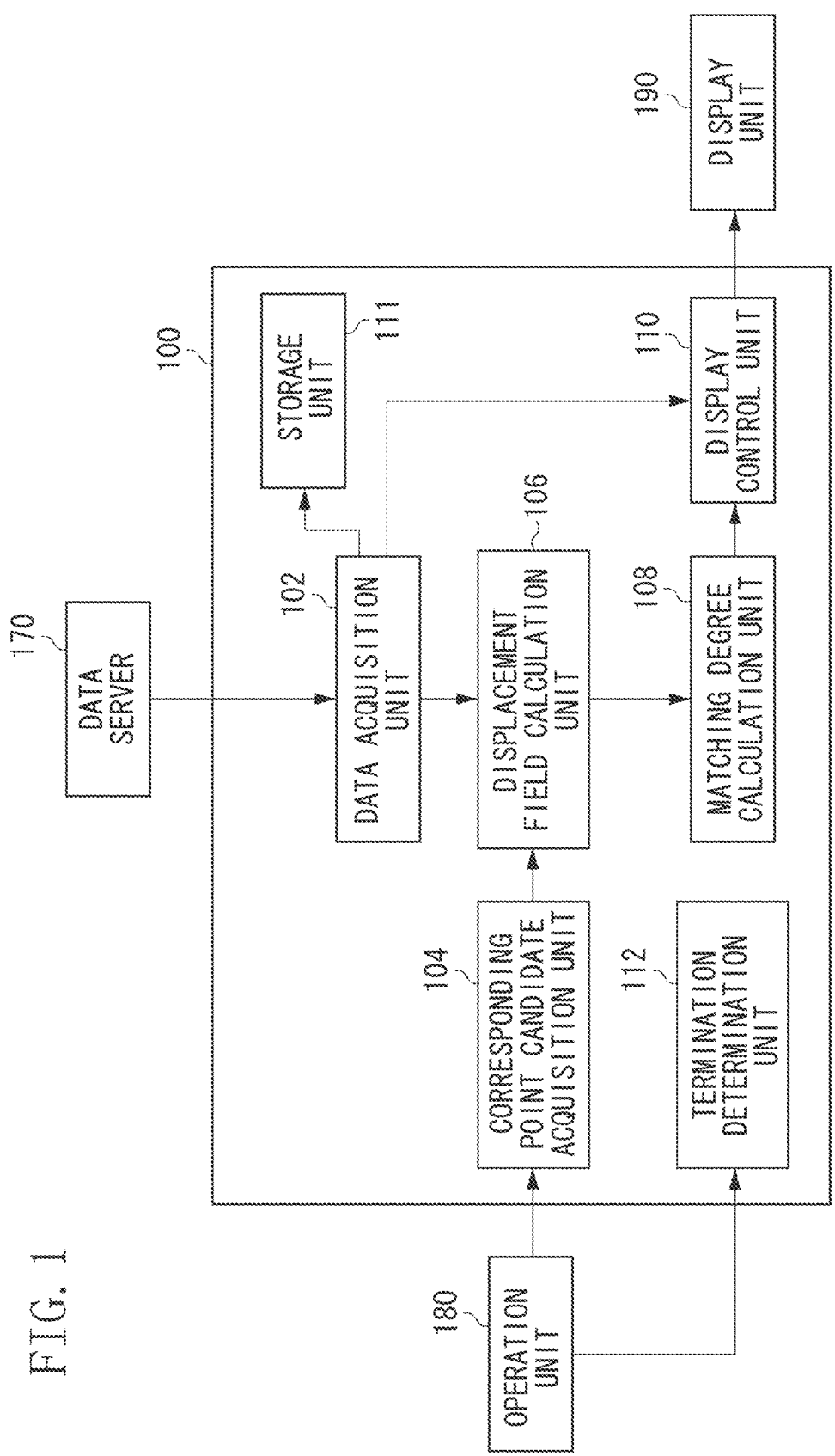
FIG. 1 is a block diagram illustrating a functional configuration example of an image processing apparatus according to first and second exemplary embodiments.

FIG. 1 is a block diagram illustrating a functional configuration example of an image processing apparatus 100 according to the present exemplary embodiment. As illustrated in FIG. 1, the image processing apparatus 100 according to the present exemplary embodiment is connected to a data server 170, an operation unit 180, and a display unit 190, and these components constitute an image processing system. As used herein, the term "unit" generally refers to any combination of software, firmware, hardware, or other component, such as circuitry, that is used to effectuate a purpose.

The data server 170 is connected to the image processing apparatus 100 through a network and stores a first image and a second image, which will be described below. The first image and the second image stored in the data server 170 are three-dimensional tomographic images obtained by capturing images of a subject in advance under different conditions (different modalities, imaging modes, times and dates, body orientations, etc.). Modalities for generating a three-dimensional tomographic image include a magnetic resonance imaging (MRI) apparatus, an X-ray computed tomography (CT) apparatus, a three-dimensional ultrasonic imaging apparatus, a photoacoustic tomography apparatus, positron emission tomography (PET)/single photon emission computed tomography (SPECT), and an optical coherence tomography (OCT) apparatus. The first image and the second image may be, for example, images that are captured in the same time period but in different modalities or different imaging modes, or may be images of the same patient that are captured in the same modality and the same body orientation but in different time periods for a follow-up observation. The first image and the second image are each constituted by a set of two-dimensional tomographic images, and the position and the orientation of each of the two-dimensional tomographic images are converted into a reference coordinate system (a coordinate system within a space with a subject serving as a reference) and stored in the data server 170. The first image and the second image expressed in the reference coordinate system are input to the image processing apparatus 100 through a data acquisition unit 102.

Furthermore, the data server 170 stores, as information on an input corresponding point group of the first image and the second image, information on three-dimensional coordinate values of each of the corresponding point pairs. These pieces of data are also input to the image processing apparatus 100 through the data acquisition unit 102. In the input corresponding point group, a common identification (ID) number is assigned to a point on the first image and a point on the second image that are associated with each other. In other words, each point in the input corresponding point group is expressed by the ID number of the point and the three-dimensional coordinates in the reference coordinate system (three position components along X, Y, and Z in the three-dimensional space).

The operation unit 180 receives an operation of the user through a mouse or a keyboard. Through this operation, a corresponding point candidate pair specified by the user is input to the image processing apparatus 100 through a corresponding point candidate acquisition unit 104. In addition, the user can instruct, through the operation unit 180, whether to terminate a process of specifying a corresponding point. A result of determining whether to terminate the process of specifying a corresponding point is input to the image processing apparatus 100 through a termination determination unit 112.

The display unit 190 displays various types of information such as a display image and matching degree information that are generated by the image processing apparatus 100. In addition, a graphical user interface (GUI) for acquiring an instruction from the user is arranged in the display unit 190.

The image processing apparatus 100 includes components described below.

The data acquisition unit 102 (correspondence information acquisition unit) acquires the first image, the second image, and the information on the input corresponding point group from the data server 170. The data acquisition unit 102 then outputs the information on the input corresponding point group to a displacement field calculation unit 106 and outputs the first image and the second image to a display control unit 110. A storage unit 111 stores information to be displayed on the display unit 190, such as information on a corresponding point pair.

The corresponding point candidate acquisition unit 104 (corresponding point candidate acquisition unit) acquires a corresponding point candidate pair (three-dimensional coordinate pair) on the first image and the second image in accordance with an operation performed on the operation unit 180 by the user, and outputs the acquired corresponding point candidate pair to the displacement field calculation unit 106. The displacement field calculation unit 106 (displacement field calculation unit) calculates, as displacement fields for deforming the first image so as to position the first image relative to the second image, a first displacement field based only on the input corresponding point group and a second displacement field with the corresponding point candidate pair being taken into consideration as well. The displacement field calculation unit 106 then outputs the calculated first and second displacement fields to a matching degree calculation unit 108.

The matching degree calculation unit 108 (matching degree calculation unit) acquires the first displacement field and the second displacement field from the displacement field calculation unit 106, and calculates the matching degree of the corresponding point candidate pair with respect to the known correspondence information, based on the acquired pieces of information. The matching degree calculation unit 108 then outputs the calculated matching degree to the display control unit 110. The display control unit 110 controls the display unit 190 to display cross-sectional images of the first image and the second image, and the information on the matching degree. The termination determination unit 112 determines whether to terminate association, in accordance with an operation performed on the operation unit 180 by the user.

FIG. 3 is a flowchart illustrating an example of overall processing procedures carried out by the image processing apparatus 100 according to the present exemplary embodiment. Hereinafter, details of the processes according to the present exemplary embodiment will be described.

(Step S300: Acquire Data)

In step S300, the data acquisition unit 102 acquires the first image, the second image, and the information on the input corresponding point group from the data server 170.

(Step S301: Calculate First Displacement Field)

In step S301, the displacement field calculation unit 106 calculates a displacement field (first displacement field) for deforming the first image so as to associate the first image with the second image, based on the information on the input corresponding point group acquired in step S300. This first displacement field is a field obtained by displacing the positions of the input corresponding point group on the first image so that these positions approach corresponding positions of the input corresponding point group on the second image as closely as possible, and interpolating the displacement so that the displacement is spatially smoothed. More specifically, the displacement field is calculated through a known method, such as free-form deformation (FFD) that expresses deformation by an interpolation of a B-spline function. In the present exemplary embodiment, the first displacement field is a displacement field expressed by FFD.

(Step S302: Acquire First Point)

In step S302, the corresponding point candidate acquisition unit 104 acquires the position (three-dimensional coordinates) of a target point (first point) on the first image in accordance with an operation performed on the operation unit 180 by the user. In other words, the corresponding point candidate acquisition unit 104 stands by until the user operates the operation unit 180, and upon the user operating the operation unit 180, the corresponding point candidate acquisition unit 104 acquires the position of the target point on the first image. Specifically, the display control unit 110 first displays cross-sectional images of the first image on the display unit 190. The user operates a mouse or a keyboard to select a target cross-sectional image, and causes the selected cross-sectional image to be displayed. The user then inputs a target position as the target point on the displayed cross-sectional image. The corresponding point candidate acquisition unit 104 converts the target position specified on the cross-sectional image into the position of the target point on the reference coordinate system by using the position and the orientation of the tomographic image in the first image. The configuration may be such that target point candidates are extracted from the first image through an image feature point extraction process such as an interest operator, and the user selects the target point from among the candidates.

(Step S303: Acquire Second Point)

In step S303, the corresponding point candidate acquisition unit 104 acquires the positions (three-dimensional coordinates) of a candidate for the point (second point) on the second image that corresponds to the target point (first point) acquired in step S302, in accordance with an operation performed on the operation unit 180 by the user. The specific method for acquiring the second point is similar to that in step S302. The corresponding point candidate acquisition unit 104 then sets the acquired first point and second point as a corresponding point candidate pair.

(Step S304: Calculate Second Displacement Field)

In step S304, the displacement field calculation unit 106 calculates a displacement field (second displacement field) for deforming the first image so as to associate the first image with the second image. The second displacement field is calculated through a process similar to the process for calculating the first displacement field in step S301. However, when the second displacement field is calculated, in addition to the input corresponding point group, the corresponding point candidate pair acquired in step S302 and step S303 is also included in restraint conditions.

(Step S305: Calculate Matching Degree)

In step S305, the matching degree calculation unit 108 calculates the matching degree of the corresponding point candidate pair with respect to the known correspondence information, by using the first displacement field calculated in step S301 and the second displacement field calculated in step S304. Here, the matching degree is obtained by quantifying a local distortion of the displacement fields that is generated through association. For example, the matching degree is calculated based on a difference between the two displacement fields. In other words, when association is performed, in a case in which the orientation of a displacement field at a position obtained after the association greatly changes, the matching degree is evaluated to be low. To the contrary, in a case in which the change in the orientation of a displacement field is small, the matching degree is evaluated to be high. In the present exemplary embodiment, the matching degree is formulated based on a change in the angle of the displacement field at a position (the position of the second point) obtained after the association.

Figure 2A:
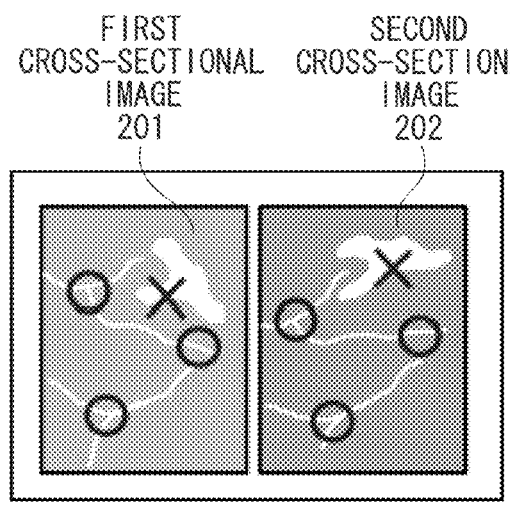
FIGS. 2A, 2B, 2C, and 2D illustrate a method for calculating a matching degree and a screen for displaying a determination result.

Now, with reference to FIGS. 2A, 2B, 2C, and 2D, the method for calculating the matching degree will be described. FIG. 2A illustrates examples of a first cross-sectional image 201 and a second cross-sectional image 202. The first cross-sectional image 201 is a two-dimensional image obtained by cutting the first image, which is three-dimensional image data, along a given plane (first cross section) and cutting out the three-dimensional image data along the first cross section. In a similar manner, the second cross-sectional image 202 is a two-dimensional image obtained by cutting the second image along a second cross section and cutting out the three-dimensional image data along the second cross section. Furthermore, the input corresponding point group and the corresponding point candidate pair (the first point and the second point) are indicated in each of the first and second cross-sectional images 201 and 202. In FIG. 2A, points enclosed by circles are the input corresponding point group. More precisely, the points enclosed by circles are points among the input corresponding point group that are present on the first and second cross-sectional images 201 and 202. A point indicated by a cross on the first cross-sectional image 201 is the first point. Meanwhile, a point indicated by a cross on the second cross-sectional image 202 is the second point.

Figure 2B:
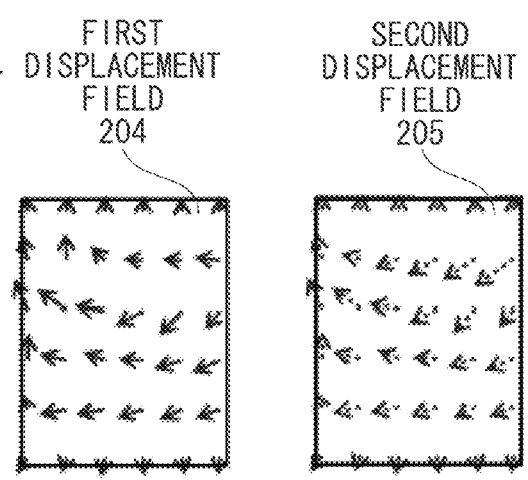

FIG. 2B illustrates a first displacement field 204 and a second displacement field 205 on the second cross-sectional image 202. Here, the first displacement field 204 is represented by $T_1$, and the second displacement field 205 is represented by $T_2$. The first displacement field $T_1$ and the second displacement field $T_2$ are each a function having a three-dimensional value defined in a space expressed by the coordinate system (reference coordinate system) of the second image. Each of the functions is a function for converting a position in the coordinate system of the second image into a position in the coordinate system of the first image, and is a function that takes a given position on the coordinate system of the second image as an argument, and returns a displacement (three-dimensional displacement vector) to a corresponding position on the coordinate system of the first image.

Figure 2C:
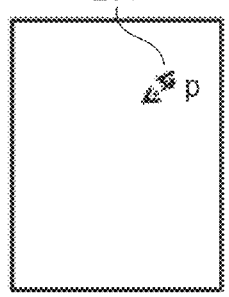

FIG. 2C illustrates an example of displacement vectors 206 (respectively represented by $t_{p,1}$ and $t_{p,2}$) of the first displacement field $T_1$ and the second displacement field $T_2$ at a position p of the second point. At this point, the matching degree calculation unit 108 calculates the matching degree M of the corresponding point candidate pair through the following Expression (1).

$$M = t_{p,1} \cdot t_{p,2} / |t_{p,1}||t_{p,2}| \qquad (1)$$

As indicated in Expression (1), calculating the matching degree M means calculating a cosine of an angle formed by the two vectors $t_{p,1}$ and $t_{p,2}$. Therefore, when the angle formed by the two vectors $t_{p,1}$ and $t_{p,2}$ is small, the value of the matching degree M is large, and the angle formed by the two vectors $t_{p,1}$ and $t_{p,2}$ is large, the value of the matching degree M is small.

The matching degree may be calculated through another method based on a difference between the first displacement field $T_1$ and the second displacement field $T_2$. For example, a determinant (Jacobian) of a Jacobian matrix may be obtained for each of the first displacement field $T_1$ and the second displacement field $T_2$ at the position p, and the matching degree may then be calculated based on the difference therebetween. In this case, when the cubic content of a local region changes, the matching degree can be determined to be low. In a similar manner, for each point in the vicinity of the position p, the value of Expression (1) or the Jacobian value may be obtained, and the value of integral thereof may be regarded as the matching degree. Furthermore, by using a method for calculating smoothness of the displacement field as discussed in D. Rueckert, L. Sonoda, C. Hayes, D. Hill, M. Leach, and D. Hawkes, "Nonrigid registration using free-form deformations: application to breast MR images," IEEE Transactions on Medical Imaging, vol. 18 (8), pp. 712-721, 1999, the smoothness of each of the first displacement field and the second displacement field in the vicinity of the position p may be obtained, and the matching degree may be calculated based on the difference therebetween (i.e., deterioration degree of the smoothness). These methods are merely examples, and the matching degree may be calculated through any method that can take a displacement field as an input and calculate a quantitative value.

(Step S306: Determine Matching Degree)

In step S306, the matching degree calculation unit 108 determines whether the value of the matching degree M calculated in step S305 is equal to or greater than a predetermined value. For example, in a case in which the matching degree M calculated through Expression (1) is used, the matching degree calculation unit 108 determines that the corresponding point candidate pair is a match if the value of the matching degree M is equal to or greater than 0.5, in other words, if the angle formed by the two vectors $t_{p,1}$ and $t_{p,2}$ is equal to or less than 60 degrees. Meanwhile, the matching degree calculation unit 108 determines that the corresponding point candidate pair is a mismatch if the value of the matching degree M is less than 0.5.

(Step S307: Determine Adding Instruction)

In step S307, the display control unit 110 displays, on the display unit 190, the value of the matching degree M calculated in step S305 and the result of determination in step S306, as information on the result of calculating the matching degree M of the corresponding point candidate pair. Then, the corresponding point candidate acquisition unit 104 determines whether the user operates the operation unit 180 and accordingly an instruction for accepting the corresponding point candidate pair as a corresponding point pair is received. Such display may be carried out only in a case in which it is determined in step S306 that the corresponding point candidate pair is a mismatch. If it is determined that the corresponding point candidate pair is a match, the processing may proceed to step S308 without waiting for an instruction from the user.

Figure 2D:
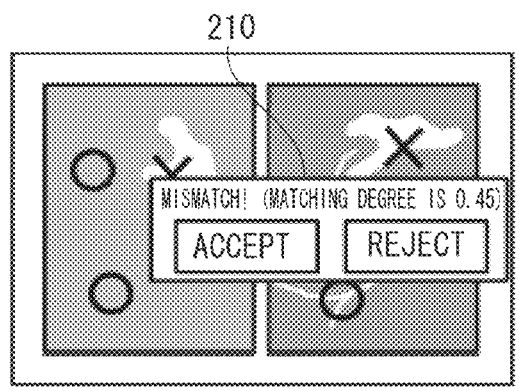

FIG. 2D illustrates an example of a GUI for prompting the user to select acceptance or rejection in a state in which the determination result is displayed. In the example illustrated in FIG. 2D, a dialog box 210 is displayed. In the dialog box 210, the value of the matching degree, the determination result, and two buttons for selecting acceptance or rejection are provided. The corresponding point candidate acquisition unit 104 acquires an instruction input through a user operation by, for example, clicking either of the buttons using a mouse. If the result of determination in step S307 indicates that acceptance is instructed (YES in step S307), the processing proceeds to step S308. Meanwhile, if rejection is instructed (NO in step S307), the processing proceeds to step S309. The dialog box 210 may display only the value of the matching degree without displaying the determination result, or may display only the determination result without displaying the value of the matching degree.

(Step S308: Add to Input Corresponding Point Group)

In step S308, the corresponding point candidate acquisition unit 104 adds the corresponding point candidate pair to the input corresponding point group as a corresponding point pair.

(Step S309: Delete Second Point)

In step S309, the corresponding point candidate acquisition unit 104 deletes the information on the second point acquired in step S303. Through this process, the image processing apparatus 100 enters a state in which only the first point is acquired and the second point is not acquired. Then, the processes in step S303 and thereafter are carried out again.

(Step S310: Determine Whether to Terminate)

In step S310, the termination determination unit 112 determines whether an instruction for terminating the process of specifying a corresponding point candidate is received. For example, the display control unit 110 displays, on a display screen, a termination button for selecting whether to terminate the process, and the termination determination unit 112 determines whether a termination instruction is input through a user operation by, for example, clicking the termination button using a mouse. If the result of determination in step S310 indicates that the termination instruction is received (YES in step S310), the processing proceeds to step S311. Meanwhile, if the termination instruction is not received (NO in step S310), the processing returns to step S301, and the processes in step S301 and thereafter are carried out again by using an updated input corresponding point group. Here, if a re-specification is not input, the image processing apparatus 100 enters a standby state while the cross-sectional image is being displayed until the termination is instructed, and receives an input.

(Step S311: Output Corresponding Point Group)

In step S311, the data acquisition unit 102 stores, into the storage unit 111, information on the corresponding point pair between the two pieces of three-dimensional image data that is newly acquired in the processes described above. Furthermore, the display control unit 110 outputs the information on these corresponding points to the display unit 190 and displays the information on the display unit 190. At this point, in order to update the information on the input corresponding point group stored in the data server 170, the information on the updated input corresponding point group may be transmitted to the data server 170 through a communication unit (not illustrated). It should be appreciated that a displacement field estimated based on the lastly acquired input corresponding point group may be stored in the storage unit 111 or the data server 170. Furthermore, by using such a displacement field, a deformation image obtained by deforming the first image so as to be associated with the second image may be generated, and the generated deformation image may be stored in the storage unit 111 or the data server 170.

As described above, the image processing apparatus according to the present exemplary embodiment includes the correspondence information acquisition unit (data acquisition unit 102) configured to acquire correspondence information between the first image and the second image, the corresponding point candidate acquisition unit (corresponding point candidate acquisition unit 104) configured to acquire a corresponding point candidate pair including the coordinates of the first point on the first image and the coordinates of the second point on the second image, the matching degree calculation unit (matching degree calculation unit 108) configured to calculate the matching degree of the corresponding point candidate pair acquired by the corresponding point candidate acquisition unit (corresponding point candidate acquisition unit 104), with respect to the correspondence information acquired by the correspondence information acquisition unit (data acquisition unit 102), and the display control unit (display control unit 110) configured to display the result of calculation by the matching degree calculation unit on the display unit. Accordingly, a function of checking whether a specified corresponding point candidate pair matches the input corresponding point group without giving the user a preconception can be provided. Therefore, if it is determined that the corresponding point candidate pair is a mismatch, the user can re-enter a point to serve as a corresponding point candidate and can specify a point at a more appropriate position.

First Modification

Although an example in which the input corresponding point group is used as the known correspondence information has been described in the present exemplary embodiment, the configuration may be such that another piece of known correspondence information is used. For example, a displacement field itself that is acquired by another unit may be used as the known correspondence information. Here, another displacement field, for example, can be obtained based on a result of a physical deformation simulation that uses a finite element model or based on anatomical knowledge.

In this case, in step S300, the data acquisition unit 102 acquires the other displacement field described above as the known correspondence information. Then, in step S301, the displacement field calculation unit 106 sets the displacement field acquired in step S300 as the first displacement field. In addition, in step S304, the displacement field calculation unit 106 obtains information corresponding to the input corresponding point group from the first displacement field, and calculates the second displacement field based on the obtained information corresponding to the input corresponding point group. Specifically, the displacement field calculation unit 106 first samples a defined range in the second image at regular intervals, and acquires a point group disposed in a lattice pattern on the second image (point group on the second image). Subsequently, the displacement field calculation unit 106 obtains the positions of all the points on the first image that correspond to the point group on the second image, by using the first displacement field, and sets the obtained points as a point group on the first image. This pair of point groups on the first image and the second image is then set as the input corresponding point group.

As described above, according to the first modification, even in a case in which an input corresponding point group cannot be obtained, the matching degree can be calculated. For example, even in a case in which an image is not clear and there are no points on the first image and the second image that clearly correspond to each other, association can be supported.

Second Modification

In the present exemplary embodiment, an example in which the matching degree is calculated based on the first displacement field and the second displacement field has been described as a process of the matching degree calculation unit 108. Alternatively, the matching degree may be calculated from the first displacement field and information on a corresponding point candidate pair, without calculating the second displacement field. In this case, for example, the matching degree M is calculated through the following Expression (2).

$$M = t_{p,1} \cdot t_{p,q} / |t_{p,1}||t_{p,q}| \quad (2),$$

where $t_{p,q}$ represents a vector connecting the position p of the second point and a position q of the first point. As indicated by Expression (2), in this case, a cosine of an angular difference between the displacement vector $t_{p,1}$ in the first displacement field and the vector $t_{p,q}$ connecting the corresponding point candidate pair is calculated. As another alternative, the matching degree M may be calculated based on a norm of a difference between the two vectors, i.e., through the following Expression (3). In this case, the distance between the position estimated based on the first displacement field and the position q of the first point that has actually been input is calculated as the matching degree.

$$M = |t_{p,1} - t_{p,q}| \quad (3)$$

As described above, according to the second modification, the matching degree can be calculated without calculating the second displacement field, throughout the entire three-dimensional image data region, and thus the amount of calculation can be reduced.

Third Modification

In the present exemplary embodiment, an example in which the matching degree is calculated based on a difference between the first displacement field and the second displacement field has been described as a process of the matching degree calculation unit 108. Alternatively, the matching degree may be calculated from the second displacement field without using the first displacement field. For example, a residual arising when an input corresponding point is displaced from one to the other by the second displacement field may be obtained, and an inverse of the average of the residuals may be obtained as the matching degree. In addition, displacement field turbulence in the second displacement field may be measured, and this displacement field turbulence may be obtained as the matching degree. For example, by using the method for calculating the smoothness of a displacement field that is discussed in D. Rueckert, L. Sonoda, C. Hayes, D. Hill, M. Leach, and D. Hawkes, "Nonrigid registration using free-form deformations: application to breast MR images," IEEE Transactions on Medical Imaging, vol. 18 (8), pp. 712-721, 1999, the smoothness of the second displacement field in the vicinity of the position p may be obtained, and the absolute value of the obtained result may be used as the matching degree. As another alternative, the determinant (Jacobian) of the Jacobian matrix of the displacement field may be obtained as the matching degree. In this case, a position at which the absolute value of the Jacobian value is large in the displacement field indicates a locally large displacement, and thus the matching degree is determined to be low. In particular, a negative Jacobian value indicates the generation of such a displacement that a space is folded, and thus the possibility of a mismatch is high. In addition, the degree of the second displacement field being vortical may be measured, and the result may be used as the matching degree of the corresponding point candidate pair.

Now, an example of a case in which a vortical displacement field is generated will be described with reference to FIGS. 4A and 4B. A corner in the lattice illustrated in FIG. 4A corresponds to a voxel position 401 in the second image. In addition, an input corresponding point 402 on the first image and a corresponding input corresponding point 403 on the second image are given. Now, assume that the corresponding point candidate acquisition unit 104 acquires a corresponding point candidate pair including a first point 405 and a second point 404 that have a displacement in the direction opposite to the direction of the displacement of the input corresponding points, in the vicinity of the input corresponding points. FIG. 4B illustrates an example of a second displacement field 406 that is in a region near the second point 404 and that is to be calculated under the above-described condition. As illustrated in FIG. 4B, the two displacement vectors that are oriented in very different directions are present close to each other, and thus the displacement field to be calculated has a vortical form representing the rotation about the vicinity of the second point 404. When such a displacement field is generated, the matching degree is considered to be low.

Hereinafter, a specific method for detecting a vortical displacement field as illustrated in FIG. 4B will be described. First, a three-dimensional region having a distance value being equal to or smaller than a certain value from the position p of the second point 404 is defined as a range 407 in which the vortex of the displacement field is to be detected. Then, the number of voxel positions contained in this range 407 is set to N. In addition, a displacement vector at the position p of the second point 404 is represented by $t_1$, and displacement vectors at respective voxel positions other than the second point 404 that are contained in the range 407 are represented by $t_2, t_3, \ldots,$ and $t_N$. At this point, the vorticity U of the displacement field contained in the range 407 is defined by the following Expression (4).

$$U = (1/N - 1) \times \sum_{i=2}^{N} (t_i \cdot ti/|t_i||ti|) \quad (4)$$

As indicated by Expression (4), in this case, for each of the displacement vectors at all the voxel positions contained in the range 407, a cosine of an angular difference relative to the displacement vector $t_1$ is calculated, and the average value of the cosines of the angular differences is then obtained. When the vorticity U is close to 1, i.e., when many of the displacement field within the range 407 is oriented in the direction close to the direction of the displacement field $t_1$, the matching degree is considered to be high. Meanwhile, as the vorticity U approaches −1, the matching degree is considered to be lower. Then, for example, if the vorticity U is equal to or greater than 0.5, the corresponding point candidate pair can be determined to be a match, and if the vorticity U is less than 0.5, the corresponding point candidate pair can be determined to be a mismatch.

As described above, according to the third modification, knowledge about a pattern that appears in a displacement field when the matching degree decreases can be used to calculate the matching degree.

An image processing apparatus according to a second exemplary embodiment displays a distribution of the matching degrees with respect to a target point input in the first image so as to support input of a corresponding point. The configuration of an image processing system according to the present exemplary embodiment is similar to the configuration illustrated in FIG. 1. However, as described below, part of the processing content of each unit is different from that of the first exemplary embodiment. Hereinafter, part of an image processing apparatus 100 according to the present exemplary embodiment that differs from the image processing apparatus 100 according to the first exemplary embodiment will be described.

FIG. 5 is a flowchart illustrating an example of overall processing procedures carried out by the image processing apparatus 100 according to the present exemplary embodiment. The processes in steps S500 through S502 are similar to the processes in steps S300 through S302, respectively, of FIG. 3. In addition, the processes in steps S505 through S507 are similar to the processes in steps S308, S310, and S311, respectively, of FIG. 3. Thus, descriptions thereof will be omitted.

(Step S503: Generate Matching Degree Image)

In step S503, the image processing apparatus 100 calculates the matching degree of each voxel position on the second image with respect to the known correspondence information assuming that each voxel position is a candidate for a point corresponding to the target point. In other words, the image processing apparatus 100 calculates the matching degree of each voxel position with respect to the known correspondence information that is to be obtained when each voxel positions is assumed to be the second point corresponding to the first point (when assumed to form a corresponding point candidate pair). Then, the image processing apparatus 100 generates a volume image (hereinafter, a matching degree image) having the matching degree in each voxel position as a voxel value. Hereinafter, with reference to the flowchart illustrated in FIG. 6, the process in step S503 will be described in detail.

Figure 6:
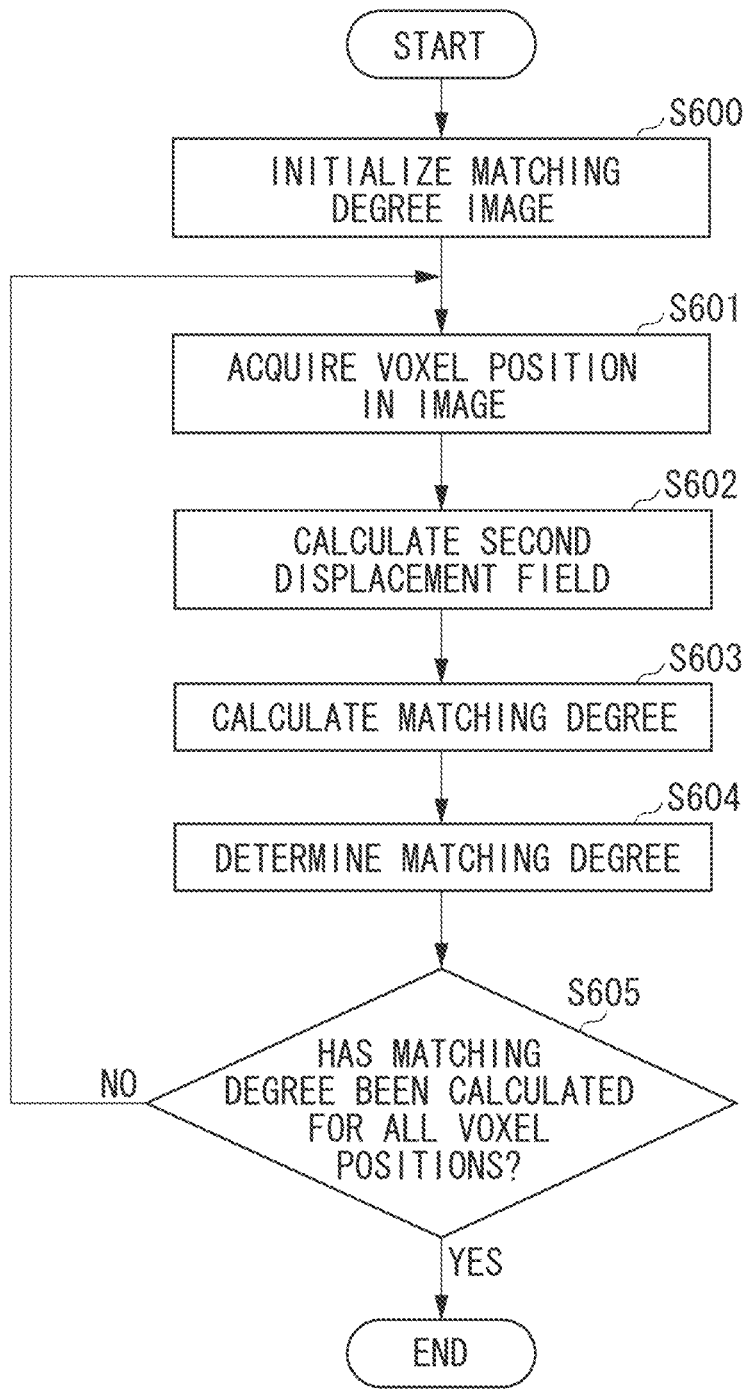
FIG. 6 is a flowchart illustrating an example of detailed processing procedures for generating a matching degree image according to the second exemplary embodiment.

FIG. 6 is a flowchart illustrating an example of detailed processing procedures in step S503 of FIG. 5.

(Step S600: Initialize Matching Degree Image)

In step S600, the matching degree calculation unit 108 generates a matching degree image that has the same size as the second image and initializes the matching degree image. At this point, the matching degree calculation unit 108 sets 0 in all of the voxel positions.

(Step S601: Acquire Voxel Position in Image)

In step S601, the corresponding point candidate acquisition unit 104 acquires the three-dimensional coordinate values of one of the voxel positions in the second image, and the data acquisition unit 102 stores an index of the acquired three-dimensional coordinate values into the storage unit 111. When the corresponding point candidate acquisition unit 104 acquires the three-dimensional coordinate values of a voxel position, the corresponding point candidate acquisition unit 104 searches for the index stored in the storage unit 111 and targets only voxel positions that have not been acquired. The voxel position corresponding to the acquired three-dimensional coordinate values has the same role as the second point in the first exemplary embodiment. In other words, the voxel position is combined with the first point acquired in step S502 to form a corresponding point candidate pair.

(Step S602: Calculate Second Displacement Field)

In step S602, the displacement field calculation unit 106 calculates the second displacement field based on the known correspondence information and the corresponding point candidate pair through the same process as the process in step S304.

(Step S603: Calculate Matching Degree)

In step S603, the matching degree calculation unit 108 calculates the matching degree of the corresponding point candidate pair with respect to the known correspondence information, based on the second displacement field acquired in step S602. This process can be implemented through a process similar to the process in step S305 of FIG. 3. Then, the calculated value is set in a voxel of the matching degree image that corresponds to the voxel position acquired in step S601, as the value of the matching degree at the voxel position.

(Step S604: Determine Matching Degree)

In step S604, the matching degree calculation unit 108 determines whether the value of the calculated matching degree is equal to or greater than a predetermined value, through a process similar to the process in step S306. Then, if it is determined that the corresponding point candidate pair is a mismatch, the matching degree calculation unit 108 sets a special value (e.g., a negative maximum value) indicating a mismatch in the voxel of the matching degree image that corresponds to the voxel position acquired in step S601.

(Step S605: Determine Whether Matching Degree has been Calculated for all Voxel Positions)

In step S605, the matching degree calculation unit 108 refers to the index stored in the storage unit 111, and determines whether there is a voxel position for which the matching degree has not been calculated. If the result of this determination indicates that the matching degree has been calculated for all the voxel positions (YES in step S605), the process in step S503 is terminated. Meanwhile, if there is still a voxel position for which the matching degree has not been calculated (NO in step S605), the processing returns to step S601, and the same process is carried out for any remaining voxel position. Through the procedures described above, the matching degree image is generated.

(Steps S504 and S505: Acquire Second Point and Add Corresponding Point Pair)

Referring back to FIG. 5, in step S504, the corresponding point candidate acquisition unit 104 acquires the position of the second point in accordance with an operation performed on the operation unit 180 by the user. Then, in step S505, the corresponding point candidate acquisition unit 104 adds the first point acquired in step S502 and the second point acquired in step S504 to the input corresponding point group as a new corresponding point pair.

Although the specific method for acquiring the second point in step S504 is basically the same as the process in step S303 of FIG. 3, the method differs in the following respect. First, the display control unit 110 displays the cross-sectional image of the second image for specifying the position of the second point, and obtains the matching degree of a cross section corresponding to the cross-sectional image in the matching degree image. Then, the display control unit 110 displays information on the distribution of the matching degree on the display unit 190. This display, for example, can be implemented in a mode in which the matching degree distribution in the form of a color map (matching degree map) is superimposed on the cross-sectional image of the second image that is expressed by gradation. For example, correspondence between the value of the matching degree and the display color is predefined in a table, and a display color determined in accordance with the table is superimposed on a corresponding voxel position on the second image. At this point, nothing is superimposed on a position for which a determination of a mismatch has been made. It is desirable that whether or not to display the information on the matching degree distribution can be selected in accordance with an instruction by the user.

The display mode of the matching degree distribution is not limited to the superimposed display of the color map indicating the matching degree, and may, for example, be a superimposed display of an isopleth of the matching degree. Alternatively, the mode may be such that, in tandem with the movement of a cursor operated by the user on the cross-sectional image of the second image, the matching degree at the coordinate indicated by the cursor is acquired from the matching degree image, and the acquired matching degree is displayed at a predetermined position within the screen or in the vicinity of the cursor in the form of character information. The display mode of the matching degree distribution is not limited to the mode in which the matching degree distribution is superimposed on the second image, and the configuration may be such that a cross section of the matching degree image taken along the same plane as the cross-sectional image of the second image is displayed next to the second image so as to make it easier to compare the matching degree image with the second image. It is desirable that the display mode of the matching degree distribution can be selected in accordance with an instruction by the user.

FIGS. 7A, 7B, and 7C illustrate a display example of the matching degree distribution. FIG. 7A illustrates a target point 701 on the first image and a matching degree map 702 defined on the second image. FIG. 7B illustrates a result 703 obtained by superimposing the matching degree map 702 on the second cross-sectional image 202. In addition, FIG. 7C illustrates an example in which, when the coordinate of a mouse cursor 704 moving over the second cross-sectional image 202 is assumed to be the second point, character information 705 indicating the matching degree is displayed at a lower right position of the mouse cursor 704. Through this display, the user can input the second point at a position where the matching degree is high and that is considered to correspond to the first point while checking the display of the second image and the matching degree distribution displayed on the display unit 190.

As described above, according to the present exemplary embodiment, the user can check the matching degree distribution, and thus the user can easily carry out association while considering the matching degree and a balance of the correspondence relation on the image. In addition, the matching degree is obtained based on an influence exerted on the displacement field by the corresponding point candidate pair, and thus there is such an effect that the matching degree with high reliability can be obtained.

Modification

In the present exemplary embodiment, the matching degree distribution is displayed before the second point is input through a user operation. Alternatively, the configuration may be such that, in step S504, the matching degree distribution is not displayed at first and after the second point is acquired, the matching degree distribution is displayed in accordance with an instruction by the user. Such a configuration makes it possible to prevent the user from being provided with a preconception about the corresponding point.

As another alternative, the configuration may be such that the matching degree distribution is displayed after the second point is acquired, only if the acquired corresponding point candidate pair is determined to be a mismatch. In this case, after step S504, the matching degree calculation unit 108 acquires the matching degree at the position of the acquired second point from the matching degree image, and determines whether to display the matching degree distribution based on the acquired matching degree. In other words, if it is determined that the corresponding point candidate pair is a mismatch, the display control unit 110 displays the determination result of the matching degree and the matching degree map so as to be superimposed on the second image. Then, the corresponding point candidate acquisition unit 104 waits for an instruction as to whether the user accepts the second point. If the user instructs to reject the second point, the second point is deleted through a process similar to the process in step S309 of FIG. 3, and the processes in step S504 and thereafter are carried out again. In this manner, the matching degree distribution is displayed only if it is determined that the corresponding point candidate pair is a mismatch, and thus there is such an effect that the user can be warned only when necessary, without being bothered.

In the first and second exemplary embodiments, the description has been given of examples in which the user carries out association one point at a time while checking the matching degree through an interactive operation. However, by repeating these processes, there is a possibility that the matching degree of the input corresponding point group changes. In a third exemplary embodiment, an example in which the matching degree of the input corresponding point group is calculated will be described. Hereinafter, part of an image processing apparatus according to the present exemplary embodiment that differs from the image processing apparatus according to the first exemplary embodiment will be described.

Figure 8:
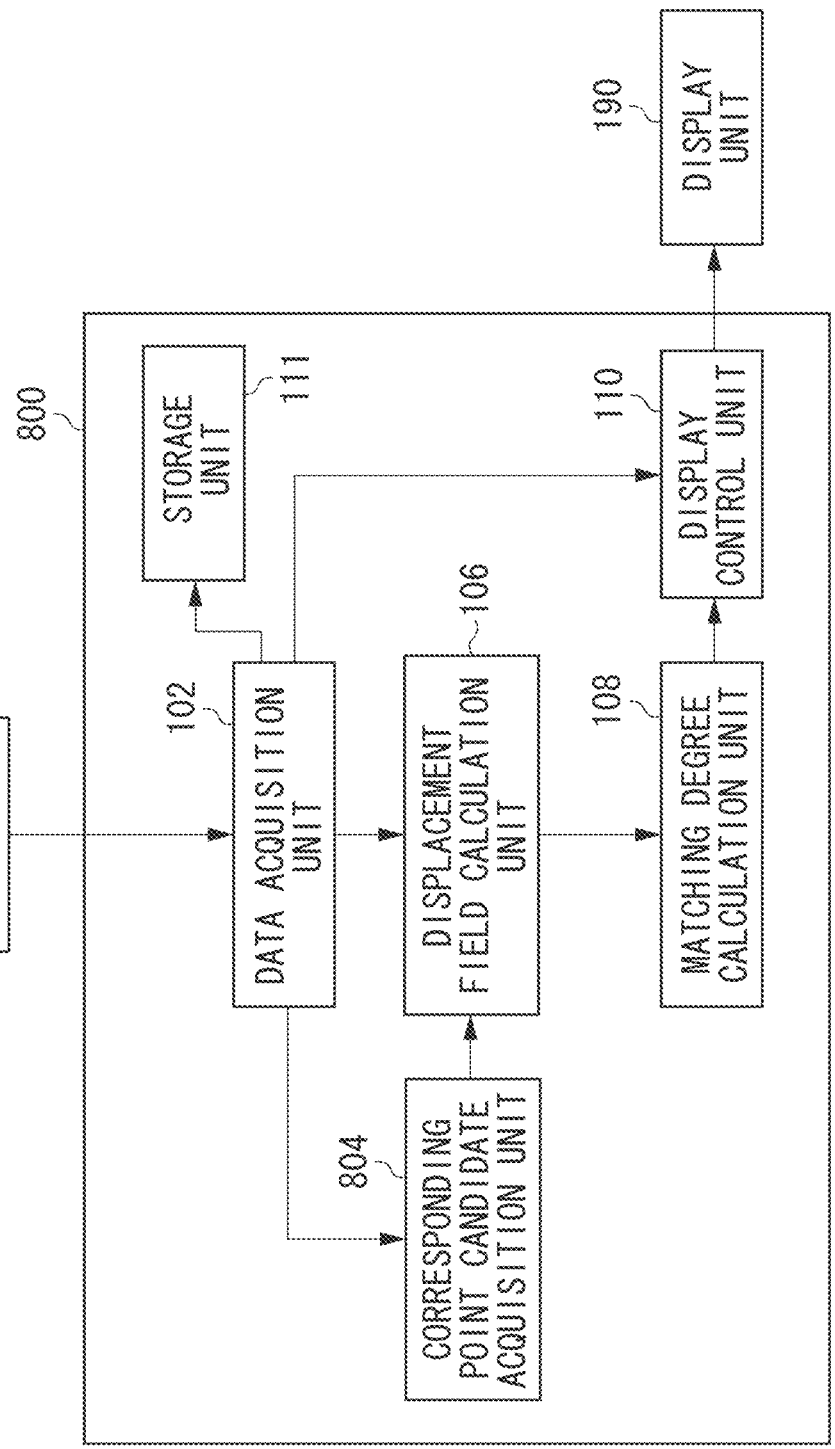
FIG. 8 is a block diagram illustrating a functional configuration example of an image processing apparatus according to a third exemplary embodiment.

FIG. 8 is a block diagram illustrating a functional configuration example of an image processing apparatus 800 according to the present exemplary embodiment. The components that are similar to those illustrated in FIG. 1 are given identical reference numerals, and description thereof will be omitted.

A corresponding point candidate acquisition unit 804 acquires an input corresponding point group from the data acquisition unit 102 and sequentially selects a pair from the input corresponding point group as a corresponding point candidate pair for which the matching degree is to be evaluated. In addition, the corresponding point candidate acquisition unit 804 acquires a point group excluding the aforementioned corresponding point candidate pair from the input corresponding point group as a displacement field calculation point group. Then, the corresponding point candidate acquisition unit 804 outputs the displacement field calculation point group to the displacement field calculation unit 106.

Figure 9:
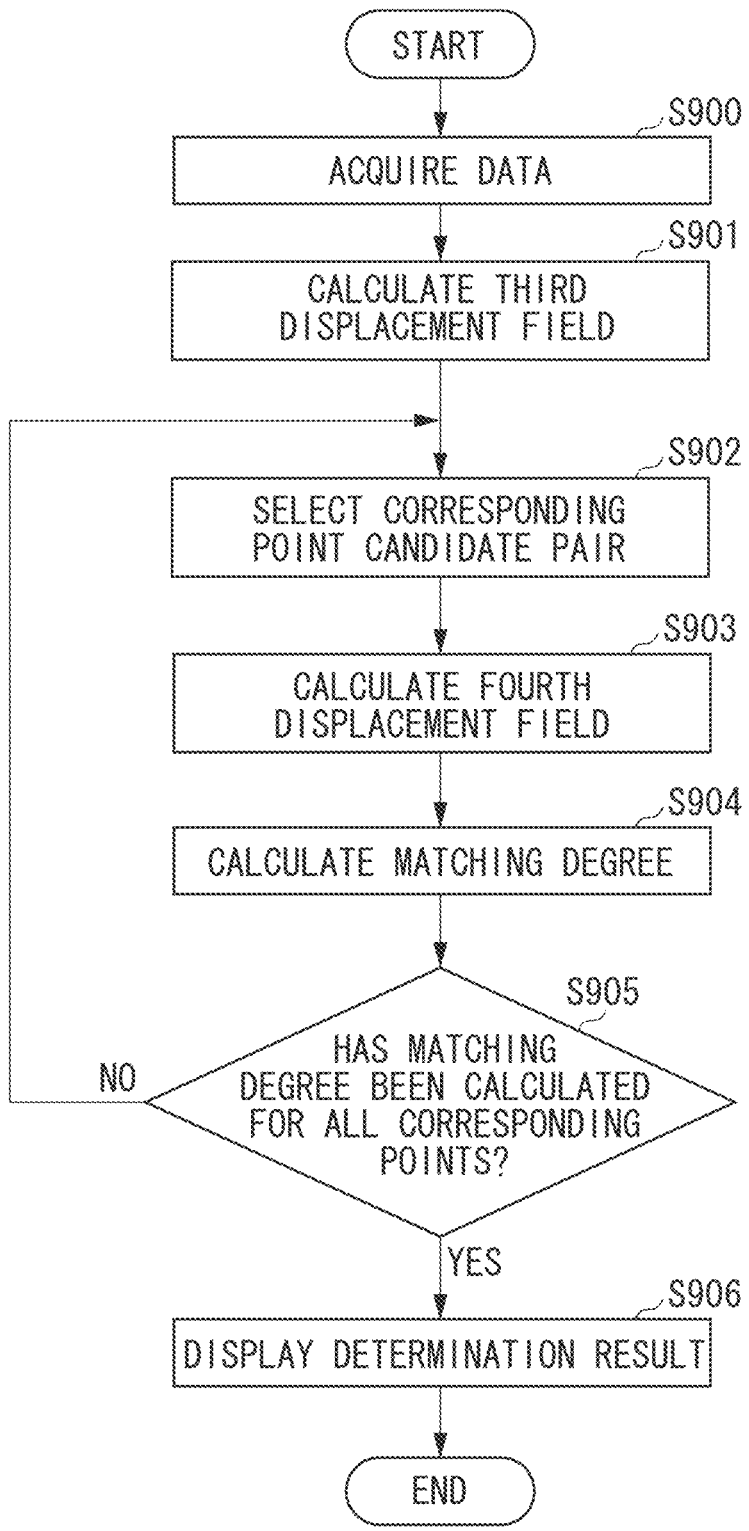
FIG. 9 is a flowchart illustrating an example of overall processing procedures carried out by the image processing apparatus according to the third exemplary embodiment.

FIG. 9 is a flowchart illustrating an example of overall processing procedures carried out by the image processing apparatus 800. The process in step S900 is similar to the process in step S300 of FIG. 3, and thus description thereof will be omitted.

(Step S901: Calculate Third Displacement Field)

In step S901, the displacement field calculation unit 106 calculates a third displacement field by using all the points in the input corresponding point group acquired from the data acquisition unit 102. Here, the third displacement field is similar to the first displacement field described in the first exemplary embodiment and can be calculated through a method similar to the method in step S301 of FIG. 3.

(Step S902: Select Corresponding Point Candidate Pair)

In step S902, the corresponding point candidate acquisition unit 804 selects a pair of points from the input corresponding point group as the corresponding point candidate pair. Then, the corresponding point candidate acquisition unit 804 acquires a remaining point group excluding the aforementioned corresponding point candidate pair as a displacement field calculation point group. Then, the data acquisition unit 102 stores the ID number of the acquired corresponding point candidate pair into the storage unit 111. When the corresponding point candidate pair is acquired, the ID numbers stored in the storage unit 111 are searched for, and only the points that have not been acquired are targeted.

(Step S903: Calculate Fourth Displacement Field)

In step S903, the displacement field calculation unit 106 calculates a fourth displacement field by using the displacement field calculation point group generated in step S902. The fourth displacement field can also be calculated through a method similar to the method in step S301 of FIG. 3.

(Step S904: Calculate Matching Degree)

In step S904, the matching degree calculation unit 108 calculates the matching degree of the corresponding point candidate pair by using the third displacement field acquired in step S901 and the fourth displacement field calculated in step S903. Here, the method for evaluating the matching degree is similar to the process in step S305 of FIG. 3. The fourth displacement field is calculated by using the point group excluding the corresponding point candidate pair from the input corresponding point group, whereas the third displacement field is calculated by using all the points in the input corresponding point group. Therefore, the matching degree of the third displacement field with respect to the fourth displacement field indicates how close the corresponding point candidate pair matches the input corresponding point group excluding the corresponding point candidate pair.

(Step S905: Has Matching Degree been Calculated for all Points?)

In step S905, the data acquisition unit 102 refers to the ID numbers of the acquired corresponding points that are stored in the storage unit 111, and determines whether there is a point for which the matching degree has not been calculated as the corresponding point candidate pair among the input corresponding point group. If the result of this determination indicates that the matching degree has been calculated for all the points (YES in step S905), the processing proceeds to step S906. Meanwhile, if there is still a point for which the matching degree has not been calculated (NO in step S905), the processing returns to step S902.

(Step S906: Display Determination Result)

In step S906, the display control unit 110 displays the determination result. The determination result is displayed, for example, through the following method. First, the matching degree calculation unit 108 determines, through a method similar to the method in step S306 of FIG. 3, whether each of the corresponding point pairs in the input corresponding point group is a match or a mismatch. Then, the display control unit 110 displays the ID number of the point that has determined to be a mismatch, on the display unit 190.

As described above, according to the present exemplary embodiment, it is possible to determine, in the input corresponding point group in which the corresponding points are already associated with each other, whether each of the corresponding point pairs matches another corresponding point group. Therefore, it becomes possible to detect an inappropriate corresponding point pair that may lead to a mismatch when an appropriate corresponding point pair is added later.

The process of determining the matching degree of the input corresponding point group as described in the present exemplary embodiment exhibits a greater effect when the first and the second exemplary embodiments are used in combination. For example, it is desirable that, in a case in which the user requests the process of calculating the matching degree of the input corresponding point group to be carried out, at a time point at which the input corresponding point group has been added to a certain degree, the matching degree of the input corresponding point group acquired up to that point be evaluated. Alternatively, it is desirable that, as a checking step after the termination instruction in step S310 of the FIG. 3 or in step S506 of FIG. 5, the matching degree of the input corresponding point group be evaluated.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-146076, filed Jul. 16, 2014, which is hereby incorporated by reference herein in its entirety.

What is claimed is:

1. An image processing apparatus, comprising at least one processor coupled to at least one memory, the at least one processor being programmed to implement operations comprising:
   acquiring correspondence information between a first image and a second image;
   acquiring information regarding a corresponding point candidate pair including information regarding a coordinate of a first point on the first image and a coordinate of a second point on the second image;
   calculating a matching degree of the corresponding point candidate pair to the correspondence information, using the correspondence information; and
   controlling to display a calculation result of the matching degree on a display unit,
   wherein the correspondence information differs from the information regarding the corresponding point candidate pair, and the correspondence information is information regarding a plurality of corresponding point pairs that has already been associated between the first image and the second image.

2. The image processing apparatus according to claim 1, wherein the at least one processor is further programmed to implement operations comprising calculating a first displacement field between the first image and the second image by using the correspondence information, and calculates a second displacement field between the first image and the second image by using the correspondence information and the corresponding point candidate pair,
   wherein the at least one processor calculates the matching degree based on a difference between the first displacement field and the second displacement field.

3. The image processing apparatus according to claim 1, wherein the at least one processor is further programmed to implement operations comprising calculating a first displacement field between the first image and the second image by using the correspondence information,
   wherein the at least one processor calculates the matching degree based on the first displacement field.

4. The image processing apparatus according to claim 1, wherein the at least one processor is further programmed to implement operations comprising calculating a second displacement field between the first image and the second image by using the correspondence information and the corresponding point candidate pair,
   wherein the at least one processor calculates the matching degree based on the second displacement field.

5. The image processing apparatus according to claim 1, wherein the matching degree represents a matching degree of the corresponding point candidate pair to positional relation of the plurality of corresponding point pairs that has already been associated between the first image and the second image.

6. The image processing apparatus according to claim 1, wherein the matching degree represents a matching degree of the corresponding point candidate pair to deformation of the first image or the second image based on the correspondence information.

7. An image processing method, comprising:
   acquiring correspondence information between a first image and a second image;
   acquiring information regarding a corresponding point candidate pair including information regarding a coordinate of a first point on the first image and a coordinate of a second point on the second image;
   calculating a matching degree of the corresponding point candidate pair to the correspondence information, using the correspondence information; and
   controlling to display a calculation result of the matching degree on a display unit,
   wherein the correspondence information differs from the information regarding the corresponding point candidate pair, and the correspondence information is information regarding a plurality of corresponding point pairs that has already been associated between the first image and the second image.

8. A non-transitory storage medium storing a program that causes a computer to execute a method comprising:
acquiring correspondence information between a first image and a second image;
acquiring information regarding a corresponding point candidate pair including information regarding a coordinate of a first point on the first image and a coordinate of a second point on the second image;
calculating a matching degree of the corresponding point candidate pair to the correspondence information, using the correspondence information; and
controlling to display a calculation result of the matching degree on a display unit,
wherein the correspondence information differs from the information regarding the corresponding point candidate pair, and the correspondence information is information regarding a plurality of corresponding point pairs that has already been associated between the first image and the second image.

* * * * *

UNITED STATES PATENT AND TRADEMARK OFFICE
CERTIFICATE OF CORRECTION

PATENT NO. : 9,588,666 B2
APPLICATION NO. : 14/799271
DATED : March 7, 2017
INVENTOR(S) : Itaru Otomaru et al.

It is certified that error appears in the above-identified patent and that said Letters Patent is hereby corrected as shown below:

On the Title Page

Item (73), after the word "Assignee:"

Delete "Canon Kabushiki Kiasha" and insert the text --Canon Kabushiki Kaisha--.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*